United States Patent

Nagashima

[11] Patent Number: 5,646,716
[45] Date of Patent: Jul. 8, 1997

[54] IMAGE RECORDING APPARATUS FOR RECORDING IMAGES FROM A TRANSMISSION-TYPE ORIGINAL

[75] Inventor: Kanji Nagashima, Kanagawa, Japan

[73] Assignee: Fuji Photo Film Co. Ltd., Kanagawa, Japan

[21] Appl. No.: 394,247

[22] Filed: Feb. 24, 1995

[30] Foreign Application Priority Data

Feb. 25, 1994 [JP] Japan .................................. 6-027843

[51] Int. Cl.$^6$ .................................................. G03B 27/54
[52] U.S. Cl. ........................................ 355/67; 355/71
[58] Field of Search .............................. 355/67, 71, 50, 355/32

[56] References Cited

U.S. PATENT DOCUMENTS 2,855,823  10/1958  Klaus ............................. 355/67

FOREIGN PATENT DOCUMENTS

59-126526  7/1984  Japan ............................. 355/67
2-242246   9/1990  Japan ....................... G03B 27/50

*Primary Examiner*—Joan H. Pendegrass
*Attorney, Agent, or Firm*—Sughrue, Mion, Zinn, Macpeak & Seas

[57] ABSTRACT

The improved image recording apparatus scans a transmission-type original with light from a light source and allows the light through the original to be focused on a light-receiving material by means of an imaging lens. The apparatus comprises the light source, a lens or a mirror that converge or collimate the light from the light source, and a lens or a mirror that have more one focus and that are placed in the optical path between said light converging or collimating lens or mirror and the transmission-type original. The apparatus is capable of so efficient utilization of light as to have a sufficient quantity of the transmitted light fall on the entrance pupil of the imaging lens and is capable of recording high-quality images that render the dust buildup or other flaws on the transmission-type original less noticeable.

30 Claims, 8 Drawing Sheets

IMAGE RECORDING APPARATUS FOR RECORDING IMAGES FROM A TRANSMISSION-TYPE ORIGINAL

BACKGROUND OF THE INVENTION

This invention relates to an image recording apparatus that is capable of recording images of high quality onto transmission originals with sufficient quantity of light even if they are overexposed negative originals.

Image recording apparatus such as color copiers and various types of color printers have chiefly been used to record images onto reflection-type originals such as printed matter. With the recent diversification in the art of recording image information, a new class of image recording apparatus have been commercialized that are capable of reading images not only from reflection-type originals such as printed matter and photographs but also from transmission-type originals such as negative films, slides, proofs and microfilms so that they are recorded onto light-sensitive and other image-receiving materials.

Image recording apparatus that can be used for both reflection and transmission-type originals are generally constructed in the following way: a light source unit that forms exposure optics for image recording from transmission-type originals is loaded onto the body of the recording apparatus and the light issuing from the light source in the unit is admitted through a transmission-type original, with the transmitted light being focused to form an image on a light-sensitive material (or a screen or a photosensor), thereby exposing it.

In this dual type of image recording apparatus, ordinary reflection-type originals are subjected to imagewise exposure with the exposure optics in the body of the recording apparatus which is a combination of a scanning head that extends one-dimensionally for issuing light of illumination, a plurality of mirrors, light modifying color filters and diaphragm, an imaging lens, etc.

To perform imagewise exposure with the exposure optics in the body of the image recording apparatus (which is hereunder referred to as the "exposure optics in the body"), the scanning head is moved in a scanning direction generally perpendicular to the direction in which it extends, whereby the reflection-type original on the document platen is scanned two-dimensionally with the light of illumination. The reflected light in the form of a slit coming from the reflection-type original is reflected by the plurality of mirrors to travel in predetermined optical paths, adjusted not only in color and the quantity (intensity) of light by means of the color filters and the diaphragm but also in the position of image formation, magnification, etc. by the imaging lens, and is admitted to form an image on the light-sensitive material for exposure in a predetermined position of imagewise exposure as it is transported in synchronism with the movement of the scanning head.

For recording images from comparatively large transmission-type originals such as slides and contact print strips with the 4×5 size, it is known to use a light source unit for that particular purpose which is adapted to illuminate a transmission-type original from above as it is placed on (or held near to) the document platen in the body of the image recording apparatus.

To read from transmission-type originals using this light source unit, one may utilize the aforementioned exposure optics in the body; stated more specifically, the light issuing from the light source unit and that has passed through the transmission-type original is scanned without lighting the light source in the scanning head, whereby the transmitted light from that original is similarly focused on the light-sensitive material to form an image in the position of imagewise exposure so that said light-sensitive material is exposed in accordance with the image of the transmission-type original.

For recording images from small-size transmission-type originals such as negative films of 135 or Brownie (120) size and slides of comparable size, Unexamined Published Japanese Patent Application (kokai) Hei 2-242246 has disclosed a film scanning unit having exposure optics of a projection type.

This type of film scanning unit is used as it is loaded onto a predetermined area of the body of an image recording apparatus and it has various components such as a projecting light source, light modifying color filters, an ND filter for adjusting the quantity of light, a document holder for holding and transporting (scanning) the transmission-type original, a slit for regulating the light passing through the transmission-type original, a zoom lens as an imaging lens and a mirror for adjusting the optical path.

Figure 9:
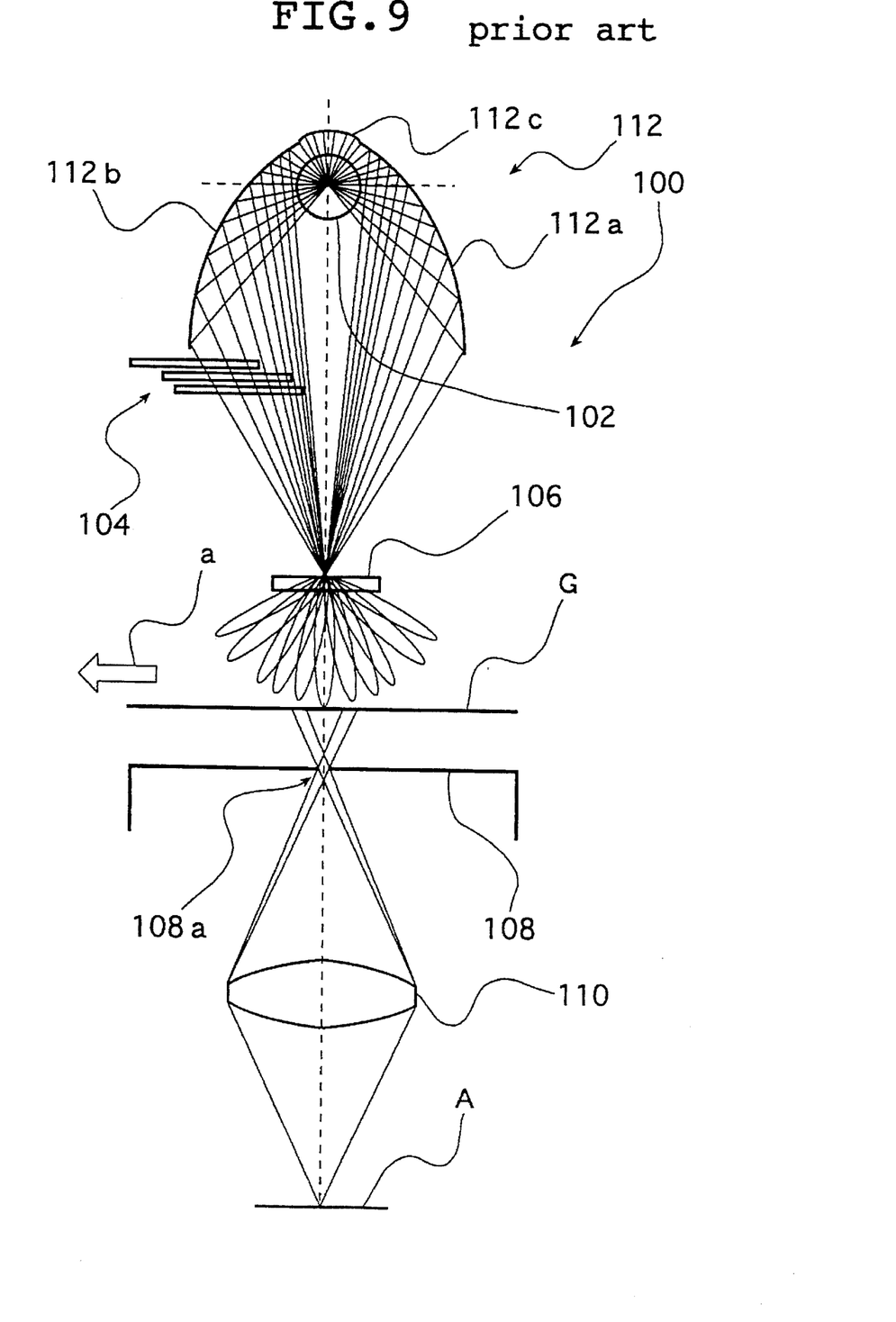
FIG. 9 is a diagram showing conceptually a prior art image recording apparatus.

An image recording apparatus using the above-described film scanning unit is shown conceptually in FIG. 9. The image recording apparatus generally indicated by 100 in FIG. 9 comprises essentially a light source 102, a light adjusting member 104, a diffuser plate 106, an aperture 108 having a slit 108a that extends longitudinally into the paper, a zoom lens (or imaging lens) 110, a reflector 112, and means (not shown) for transporting a transmission-type original G.

For recording the image of the transmission-type original G with the illustrated apparatus 100, the light issuing from the light source 102 is reflected by the reflector 112 composed of elliptical mirrors 112a and 112b and a circular mirror 112c and thereafter travels toward the original G. The reflector 112 is so designed that it has a focal point on the diffuser plate 106 in registry with the optical axis L of the imaging lens.

The light reflected by the reflector 112 is subsequently adjusted in color balance and the quantity (intensity) of light by means of the light adjusting member 104 composed of three color filters (C, M and Y) before it is launched into and diffused by the diffuser plate 106.

The light diffused by the diffuser plate 106 is launched into the transmission-type original G carried on a document holder (not shown) and the resulting transmitted light carrying the image of the original G then passes through the slit 108a in the aperture 108 to become elongated slit light.

The transmission-type original G (hence the document holder) is transported in a document scanning direction indicated by arrow a which corresponds to the direction of the movement of the light-sensitive material A in the body of the recording apparatus. Since the slit 108a extends longitudinally into the paper (in a direction generally perpendicular to the direction of transport), the result will be the same as if the original G were subjected to slit scanning.

The transmitted light which has passed through the slit 108a then passes through the imaging lens 110, whereby it is enlarged to a magnification setting before it is launched into the exposure optics in the body. In the exposure optics in the body, the optical path of the transmitted light is brought into alignment with that of the aforementioned reflected light from the reflection-type original by means of a mirror that can be inserted into or removed from the optical path of the transmitted light; thus, as in the recording of the image of the reflection-type original, the transmitted light is launched into and focused to form an image on the light-sensitive material A being transported in synchronism with the transport of the transmission-type original G, hereby exposing the light-sensitive material A.

In the above-described image recording apparatus 100 depending on slit scanning for exposure, the light that has been diffused by the diffuser plate 106 and which has passed through the transmission-type original G will contribute to the exposure of the light-sensitive material A but this is due to the portion of the transmitted light that has passed through the slit 108a in the aperture 108 to be incident on the entrance pupil of the imaging lens 110.

The aperture 108 serves to restrict the image range so as to reduce possible deterioration in resolution (due to lens distortion) during scanning and, hence, it is essential to the purpose of accomplishing the recording of high-quality image. The diffuser plate 106 will produce the diffused light that is necessary to render less noticeable dust, flaws and other defects that have built up or occurred on the transmission type original G and this is also indispensable to the purpose of accomplishing the recording of high-quality image.

In fact, however, the need for the diffuser plate 106 and the aperture 108 has lowered the efficiency of utilization of the light from the light source 102 in the conventional model of image recording apparatus 100, making it sometimes impossible to insure an adequate amount of exposing light.

Stated more specifically with reference to FIG. 9 in which rays of light from the light source 102 are shown to be spaced apart by equal angles, the light travelling directly from the light source 102 toward the diffuser plate 106 is divergent whereas only the rays that are convergent on the diffuser plate 106 are those of the light that has been reflected by the elliptical mirrors 112a and 112b and which are launched into the diffuser plate at angles; hence, the proportion of the diffused light that will pass through the aperture 108 linearly to be incident on the entrance pupil of the imaging lens 110 is low enough to reduce the efficiency of utilization of light.

Additionally, in order to enhance the resolution of the image being recorded, the slit 108a formed in the aperture 108 has to be narrow but then the effective viewing angle of the imaging lens 110 will become even narrower to further reduce the efficiency of utilization of light.

Compared to those to be recorded on positive films such as reversal films, the images to be recorded on negative films have wide density ranges and image recording apparatus that are capable of using negative films as transmission-type original G must occasionally handle those negative films which have images recorded at inappropriately high density (as overexposed). However, as mentioned above, the conventional model of image recording apparatus 100 permits only inefficient utilization of light, so if the image of transmission-type original G to be recorded has been overexposed, a sufficient quantity (intensity) of the transmitted light to expose the light-sensitive material A cannot be launched to the entrance pupil of the imaging lens 110 so as to expose the light-sensitive material with a sufficient amount of exposing light, thereby making it impossible to achieve the recording of high-quality image.

With a view to insuring a sufficient amount of light for exposing the light-sensitive material A, one may think of increasing the quantity of light available from the light source 102, adjusting optical members such as imaging lens 110 or extending the time of exposure. However, adjustments by the light source 102 or the imaging lens, particularly a zoom lens, as an optical member are limited in effectiveness whereas extending the exposure time has the disadvantage of taking much time for image recording.

SUMMARY OF THE INVENTION

The present invention has been accomplished under these circumstances and has as an object providing an apparatus for recording the images of transmission-type originals including negative films and reversal films, which is capable of so efficient utilization of light as to have a sufficient quantity (intensity) of the transmitted light fall on the entrance pupil of an imaging lens and which is capable of recording high-quality images that render the dust buildup or other flaws on the transmission-type original less noticeable and which yet is simple in design layout and which allows for efficient image recording without extending the time of exposure.

This object can be attained by an image recording apparatus that scans a transmission-type original with light from a light source and that allows the transmitted light from said transmission-type original to be focused on a light-receiving material by means of an imaging lens, which is characterized by comprising the light source, a lens or a mirror that converge or collimate the light from said light source, and a lens or a mirror that have more than one focus and that are placed in the optical path between said light converging or collimating lens or mirror and the transmission-type original.

Preferably, one of the foci of said multifocal lens or mirror is on the transmission-type original.

In another preferred embodiment, the distribution of light intensity $P(\theta)$ relative to the incident angle as measured at the point of focus on transmission-type original is generally expressed by $P(\theta)=\cos\theta$ with $\theta$ being zero degrees in a direction normal to the plane of transmission-type original.

Preferably, one of the foci of the multifocal lens or mirror is at infinity.

Preferably, the multifocal lens or mirror has different refractive powers in directions that cross each other at right angles.

In yet another preferred embodiment, the image recording apparatus has at least one additional means provided in the optical path from light source to light-receiving material, the at least one additional means being selected from the group consisting of means for adjusting the quantity of light, means for adjusting color balance and means for adjusting the balance of light quantity across the plane of said transmission-type original.

The at least one additional means is preferably located in the optical path near the light converging position or at the position where the light is collimated.

In yet another preferred embodiment, the image recording apparatus has an optical path bending mirror provided in the optical path from light source to light-receiving member.

The optical path bending mirror is preferably a cold mirror.

Preferably, the optical axis of light incident on the optical path bending mirror forms an angle of less than 90 degrees with the optical axis of light exiting from the mirror.

The optical path bending mirror has preferably a parabolic or elliptical surface.

In still another preferred embodiment, the light-receiving material is at least one member selected from the group consisting of a light-sensitive material, a screen and a photosensor.

DETAILED DESCRIPTION OF THE INVENTION

The image recording apparatus of the present invention is used to record the images of various transmission-type originals including negative films and slides of 135 or Brownie (120) size by scanning exposure and it is essentially characterized by placing a multifocal lens or mirror in the optical path between a reflector (i.e., a member for reflecting the light from a light source) and the transmission-type original.

Figure 2:
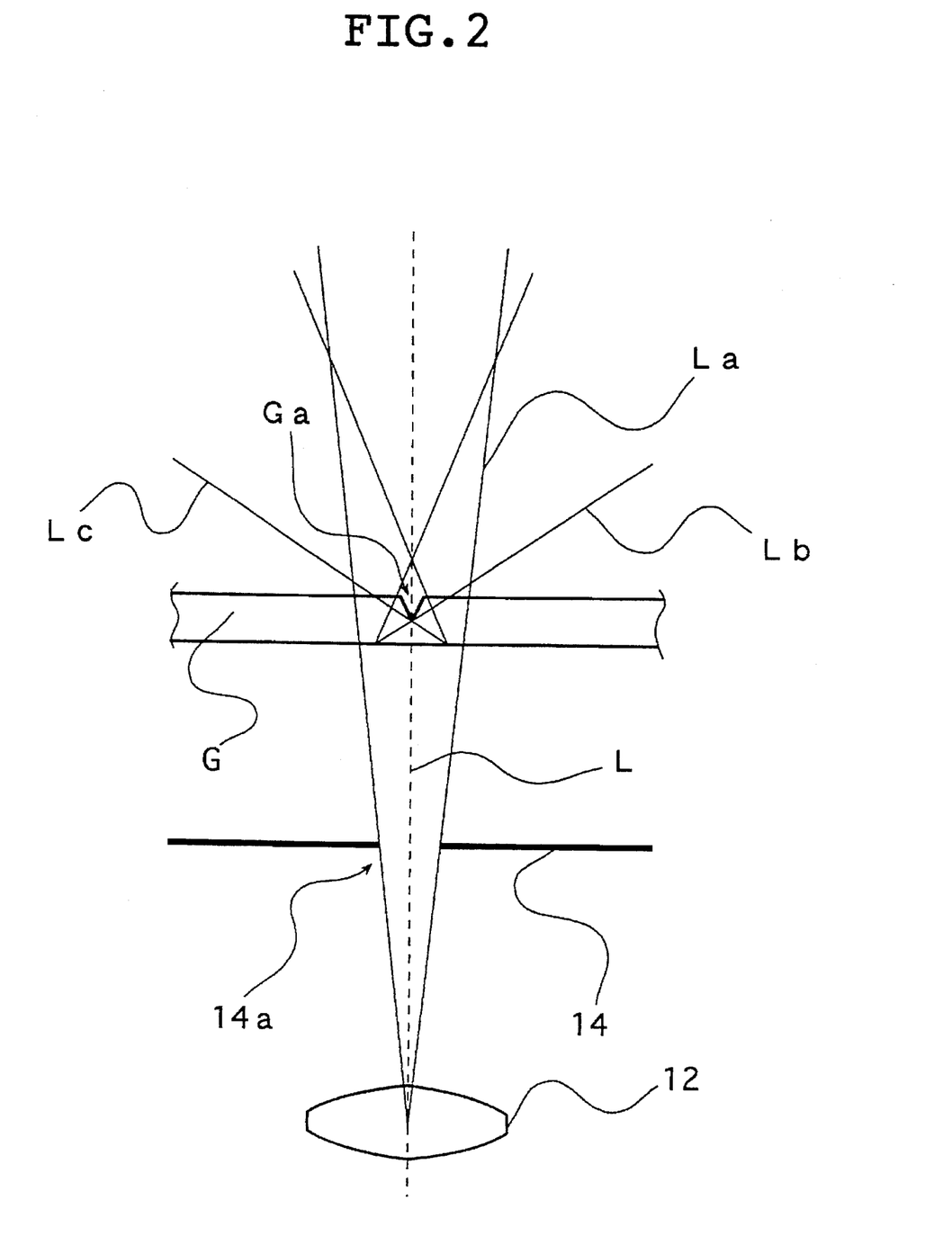
FIG. 2 is a diagram showing conceptually the operating principle of the apparatus.

A bifocal lens may be provided in the optical path defined above and, as shown in FIG. 2, the lens is so designed that one of its foci is on the transmission-type original G (on its underside in the illustrated case) whereas the other focus coincides with the entrance pupil of an imaging lens 12. Shown by 14 in FIG. 2 is an aperture having a slit 14a that extends longitudinally into the paper.

Although no diffuser plate is used in the recording apparatus of the invention, the two components of light Lb and Lc that are incident on the multifocal lens in areas that focus on the transmission-type original G and which are incident on the latter at angles will perform the same function as the diffused light created by the diffuser plate 106 shown in FIG. 9, thereby allowing for the recording of high-quality image on which flaws Ga or dust, if any, are not very much noticeable.

On the other hand, the components of light La which is incident on the multifocal lens in the area that has a focus at the entrance pupil of the imaging lens 12 will pass through the transmission-type original G, then through the slit 14a to provide a component that will contribute to the exposure of the light-sensitive material. Thus, in the present invention, the component of light that contributes to exposure is converged by the multifocal lens, thereby insuring that a large quantity of the transmitted light will be incident on the entrance pupil of the imaging lens 12 at an extremely high optical efficiency.

Hence, using the image recording apparatus of the invention, one can dispense with a diffuser plate and yet accomplishes the recording of high-quality images from transmission-type originals without causing flaws or dust, if any, to be noticeable to an undesirable extent. Further, a sufficient quantity (intensity) of the transmitted light can be produced with a satisfactory optical efficiency to insure that images of satisfactory quality are recorded even if the transmission-type original used is an overexposed negative film.

Additionally, the apparatus of the invention is simple in design and can be constructed by merely inserting a lens or a mirror into the optical path in the conventional model shown in FIG. 9 and yet images can be rapidly recorded without the need to extend the time of exposure.

The image recording apparatus of the invention will now be described in detail with reference to the preferred embodiments shown in the accompanying drawings.

Figure 1:
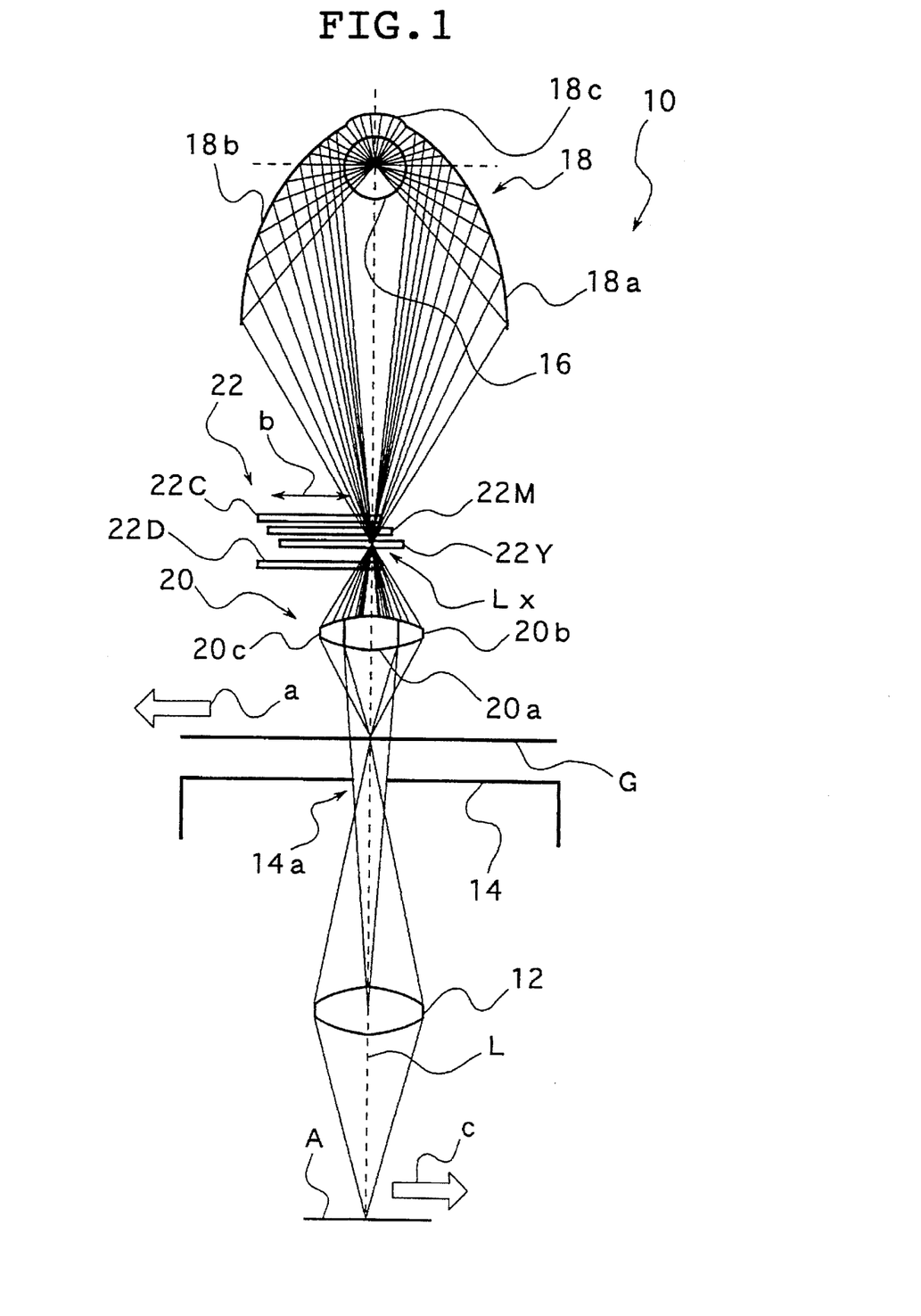
FIG. 1 is a diagram showing conceptually an embodiment of the image recording apparatus of the invention.

FIG. 1 shows conceptually an embodiment of the image recording apparatus of the invention. While this particular example uses a light-sensitive material as a light-receiving material, it should be noted that the image recording apparatus of the invention allows for the use of other light-receiving materials such as various types of optical sensors (e.g. CCD sensors and photoelectric tubes) and screens.

The image recording apparatus generally indicated by 10 in FIG. 1 is so adapted that the image of a transmission-type original G (hereunder referred to simply as an "original G") such as a negative film or a reversal film is recorded on a light-sensitive material A and it comprises essentially a light source 16, a reflector 18, a multifocal lens 20, light adjusting means 22, an aperture 14 having a slit 14a formed therein that extends longitudinally into the paper, an imaging lens 12, means (not shown) for transporting the original G and means (also not shown) for transporting the light-sensitive material A.

In the apparatus 10, the slit 14a in the aperture 14 is positioned on the optical axis of the imaging lens 12 and the original G is transported in a direction (of arrow a) in which the original G is to be transported and which is perpendicular to the length of the slit 14a, whereby the original G is subjected to slit scanning and the resulting transmitted light is used to expose the light-sensitive material A by slit exposure.

The above-specified components of the image recording apparatus of the invention (and, if necessary, the processor of the light-sensitive material) may be integrated as a unitary assembly or, alternatively, as in the already-described prior art model, a slit scanning unit for use with transmission-type originals that comprises the light source 16, reflector 18, multifocal lens 20, aperture 14, imaging lens 12, the means for transporting the original G and the means for transporting the light-sensitive material A may be loaded into the body of an image recording apparatus that is designed for recording the images of reflection-type originals and the like by exposure through slit scanning.

In the apparatus 10 shown in FIG. 1, the light source 16 is a rod-like light source that extends longitudinally into the paper (i.e., in a directional normal to the direction in which the original G is to be scanned) and it is located on the optical axis L of the imaging lens 12. Any known light sources such as a halogen lamp, a mercury lamp, a fluorescent lamp, a xenon lamp and a metal halide lamp may be employed.

The light issuing from the light source 16 either goes directly toward the original G or most of it will be reflected by the reflector 18 to travel toward the original G.

The reflector 18 has three reflector plates that extend longitudinally in the same direction as the light source and they are two elliptical mirrors 18a and 18b that are positioned on opposite sides of the light source 16, as well as a circular mirror 18c that is positioned above the light source 16; the reflector 18 is configured to be symmetric with the optical axis L. In the embodiment shown in FIG. 1, two elliptical mirrors 18a and 18b are so set that they focus light at the focal point Lx on the optical axis L.

If necessary, a heat absorbing member may also be provided just downstream of the reflector 18 in the direction in which light travels (the word "downstream" is hereunder used wherever "just downstream" is meant). A preferred example of the heat absorbing member is a heat absorbing plate such as HA50 of HOYA CORP.

Light adjusting means 22 is provided upstream of, but near, the focal point Lx. The light adjusting means 22 will adjust the color balance and quantity (intensity) of the light from the light source 16 and the reflector 18 and it comprises three color filters, i.e., a cyan filter 22C, a magenta filter 22M and a yellow filter 22Y, and light quantity adjusting means (stop diaphragm) 22D.

The color filters used in the apparatus shown in FIG. 1 are in a plate form and adapted to be movable in the direction of arrow b. The amount by which each color filter is inserted into the optical path is adjusted, whereby the color balance of the light from the light source 16 and the reflector 18 is adjusted.

The light quantity adjusting means 22D will adjust the quantity (or intensity) of the light from the light source 16 and the reflector 18 and any known means for adjusting the quantity of light may be employed as exemplified by a light-shielding plate that can be inserted into or removed from the optical path by an adjustable amount, ND filters of different optical densities that can be selectively inserted into the optical path, a ND filter that has a stepped or graded density profile and which can be inserted adjustably into the optical path.

The light adjusting means 22 used in the example shown in FIG. 1 has the light quantity adjusting means 22D but this is not the sole case of the invention and the quantity of light may be adjusted by inserting the three color filters (C, M and Y) in equal amounts. However, as will be mentioned later in this invention, the image recording apparatus 10 of the invention has an extremely high optical efficiency and permits a large quantity of the transmitted light (from the original G) to be launched at the entrance pupil of the imaging lens 12; therefore, adjusting the quantity of light by means of color filters will broaden the range over which the filters have to be adjusted, introducing considerable difficulty in making fine adjustments of color balance and light quantity. Hence, it is preferred to provide dedicated means for adjusting the quantity of light in the invention.

In a preferred embodiment, the light adjusting means 22 may optionally be furnished with an optical member for adjusting the balance in the quantity of light across the surface of the original G. Such optical member may be exemplified by a ND filter having a density gradient or a light-shielding member that can be inserted into or removed out of the optical path.

If, as in the embodiment shown in FIG. 1, the image recording apparatus has focus Lx in the optical path from each of the light source 16 and the reflector 18 to the original G, the light adjusting means 22 may be positioned near this focal point Lx.

This arrangement contributes to reduction in the size of optical members such as color filters, thus proving advantageous in such aspects as the cost and size of the apparatus, and the degree of freedom in its design.

The light that has been adjusted in color balance and quantity of light by the light adjusting means 22 is then launched into the multifocal lens 20. The multifocal lens 20 is a lens that extends longitudinally in the same direction as the slit 14a (i.e., a direction perpendicular to the direction in which the original G is scanned) and, as shown in FIG. 1, the central portion of the shorter side (i.e., the width of slit 14a) which is hereunder referred to as the central part 20a has a different focus than both end portions which are hereunder referred to as peripheral parts 20b and 20c; the multifocal lens 20 is so positioned that the optical axis through the central part 20a coincides with the optical axis L of the imaging lens 12.

Since the apparatus shown in FIG. 1 is adapted for exposure by slit scanning, the multifocal lens 20 has a large refractive power in the direction of the shorter side and has a small or no power in the direction of the longer side.

In the illustrated apparatus, the central part 20a of the multifocal lens 20 has a focus at the pupil of the imaging lens 12 whereas the peripheral parts 20b and 20c have a focus on the original G.

Using the multifocal lens 20 having the features described above, the apparatus of the invention is capable of recording high-quality images on which flaws and dust, if any, are not highly noticeable and, at the same time, satisfactory optical efficiency can be realized.

The configuration and function of the multifocal lens 20 will be described in greater details later in this specification.

The light passing through the multifocal lens 20 is then transmitted through the original G which is moved in its scanning direction (of arrow a) by the transport means (not shown), thus becoming transmitted light which carries the image of the original G.

The means for transporting the original G is not limited in any particular way and a holder of the original G may be transported by any known means such as a screw transmission mechanism, belt transmission mechanism, belt transport, roller transport or the combination thereof; alternatively, the original G may be transported directly by known means for the transport of sheeting such as belt transport, roller transport or the combination thereof.

The transmitted light from the original G is then narrowed to slit light by means of the aperture 14 provided with the slit 14a which extends longitudinally into the paper (i.e., in a direction normal to the direction in which the original G is to be scanned).

The original G moves in the scan direction (of arrow a) which corresponds to the direction in which the light-sensitive material A to be described later in this specification will be scanned. On the other hand, the aperture 14 is positioned in such a way that the slit 14a formed in it extends longitudinally in a direction generally normal to the direction of movement of the original G and that the center of the slit 14a taken in the scan direction coincides with the optical axis of the imaging lens 12. Hence, the result is the same as if the original G was subjected to slit scanning.

The transmitted light from the slit 14a is then launched into the imaging (zoom) lens 12, which forms an enlarged image on the light-sensitive material, typically magnified to 200–850% of the initial size.

The light-sensitive material A is transported by the transport means (not shown) in the scan direction (of arrow c in FIG. 1) which is normal to the length of the slit 14a and, therefore, it is subjected to full-frame exposure by slit scanning with the slit, transmitted light so that imagewise exposure of the light-sensitive material A is done in association with the original G.

If the original G is of a small size such as 135 size, the imaging lens 12 is preferably a zoom lens as shown in FIG. 1 considering such factors as the size of the image to be recorded. However, this is not the sole case of the invention and the imaging lens 12 may have a fixed magnification.

The means for transporting the light-sensitive material A also is not limited in any particular way and belt transport, roller transport or any other known means for the transport of sheeting that is commonly used as means for transporting light-sensitive materials in image recording apparatus may be employed.

As already mentioned above, the image recording apparatus 10 of the invention has the multifocal lens 20 provided in the optical path between the focus Lx of each of the elliptical mirrors 18a and 18b and the original G. The central part 20a of the multifocal lens 20 has a focus at the pupil of the imaging lens 12 whereas each of the peripheral parts 20b and 20c has a focus on the original G.

Having the structural features described above, the apparatus 10 of the invention assures that high-quality images on which flaws and dust, if any, are not highly noticeable can be recorded while achieving a satisfactory optical efficiency.

As shown specifically in FIG. 2, the components of light Lb and Lc which are focused on the original G (on its underside in the case shown in FIG. 2) by the peripheral parts 20b and 20c of the multifocal lens 20 will fall on the original G at an angle with the optical axis L of the imaging lens 12. Hence, these components of light Lb and Lc will produce an effect equivalent to that of "dark-field illumination" and function like the diffused light from the diffuser plate 106 used in the conventional image recording apparatus 100 (shown in FIG. 9) for use with transmission-type originals (a certain component of light is refracted by the flaw Ga on the original G to be launched into the imaging lens 12). Thus, the image finally recorded on the light-sensitive material A is of high quality in that the flaw Ga or dust buildup, if any, on the original G is not highly noticeable.

On the other hand, the component of light La which has passed through the central part 20a of the multifocal lens 20 will pass through the original G and the resulting transmitted light carrying the image of the original G will pass through the aperture 14 as its width is restricted by the slit 14a, followed by its convergence at the entrance pupil of the imaging lens 12. Thus, the image recording apparatus of the invention assures that the transmitted light which contributes to the exposure of the light-sensitive material is converged at the entrance pupil of the imaging lens 12 by the central part 20a of the multifocal lens 20 as in the case of "light-field illumination", whereby a large quantity of the transmitted light can be launched at the entrance pupil of the imaging lens 12 with an extremely high optical efficiency.

Thus, using the above-described image recording apparatus of the invention, one can dispense with a diffuser plate and yet enables the recording of high-quality images from transmission-type originals without causing flaws or dust, if any, to be noticeable to an undesirable extent. Further, a sufficient quantity of the transmitted light can be produced with a satisfactory optical efficiency to insure that images of satisfactory quality are recorded even if the transmission-type original used is an overexposed negative film. Additionally, the transmitted light is converged at the pupil of the imaging lens 12 and, hence, images of high contrast can be recorded.

Further, the apparatus of the invention is simple in design and can be constructed by merely inserting the lens or mirror into the optical path in the conventional model (shown in FIG. 9) and yet images can be rapidly recorded without the need to extend the time of exposure.

The multifocal lens 20 can readily be fabricated from plastics.

The sizes of the central part 20a and the peripheral parts 20b and 20c of the multifocal lens 20 are each determined by the relationship between the aperture 14 and the imaging lens 12. Stated specifically, one may determine the sizes of the central part 20a and the peripheral parts 20b and 20c in accordance with such factors as the focal lengths of the imaging lens 12 and the respective parts of the multifocal lens 20, the distance from the multifocal lens 20 to the aperture 14 and the size of the slit 14a formed in the aperture 14, so that a sufficient quantity of light is converged on the original G while the transmitted light will be incident on the imaging lens 12 without any optical loss.

In the illustrated case, the central part 20a of the multifocal lens 20 and the slit 14a in the aperture 14 are so configured that the beam size of light component La is substantially the same as the size of the slit 14a to insure that the component La which is the transmitted light to enter the pupil of the imaging lens 12 will not be undesirably cut by the slit 14a. However, this is not the sole case of the invention and the beam of the light component La may be thinner than the slit 14a to prevent any cutting of the component La by the slit 14a. Conversely, the beam of component La may be thicker than the slit 14a to insure that the quantity of the transmitted light entering the pupil of the imaging lens 12 will not experience any great variations even if there are errors, for example, in the assembly of the apparatus.

As already mentioned above, the imaging lens 12 in the image recording apparatus 10 shown in FIG. 1 is a zoom lens and, hence, the position of its pupil is variable with the magnification of recorded image. If this is the case, the central part 20a of the multifocal lens 20 may be configured to have a focus at the pupil for a substantial average magnification in the range of zoom ratios. If cost and space permit, the central part 20a may be configured as a zoom lens or, alternatively, only the central part 20a of the multifocal lens 20 may be adapted to be movable along the optical axis L, so that the focus of the central part 20a is always set in the position of the pupil of the imaging lens 12.

If density profile along the length of the slit 14a is not uniform, this may be compensated by insuring that a zoom ratio that produces the worst distribution in the quantity of the transmitted light, the focus of the central part 20a coincides with the position (usually the position of the pupil) where the distribution in the quantity of light along the length of the slit 14a is uniform.

In the case shown in FIG. 2, the light component Lb which passes through the peripheral part 20b and the component Lc which passes through the other peripheral part 20c will focus at different positions on the original G; however, this is not the sole case of the invention and both peripheral parts 20b and 20c may have the same focus.

In the illustrated case, the foci of the peripheral parts 20b and 20c are set to lie on the underside of the original G; it should, however, be noted that the invention permits other cases such as where the foci of those parts lie on the top side of the original or in an intermediate portion.

In a preferred case of the image recording apparatus having a focus or foci on the original G, the distribution of light intensity P(θ) relative to the incident angle θ as measured at the point of the focus of the original G is generally expressed by P(θ)=cosθ with θ being zero degrees in a direction normal to the plane of the original G.

This design provides a better distribution of the quantity of light across the original G to assure the recording of a high-quality image on which flaws or dust, if any, are not highly noticeable.

The above-described image recording apparatus 10 of the invention has the multifocal lens 20 provided downstream of the focal point of the elliptical mirrors 18a and 18b in the reflector 18; however, this is not the sole case of the invention and the multifocal lens may be provided upstream of the focal point of the elliptical mirrors 18a and 18b.

Figure 3:
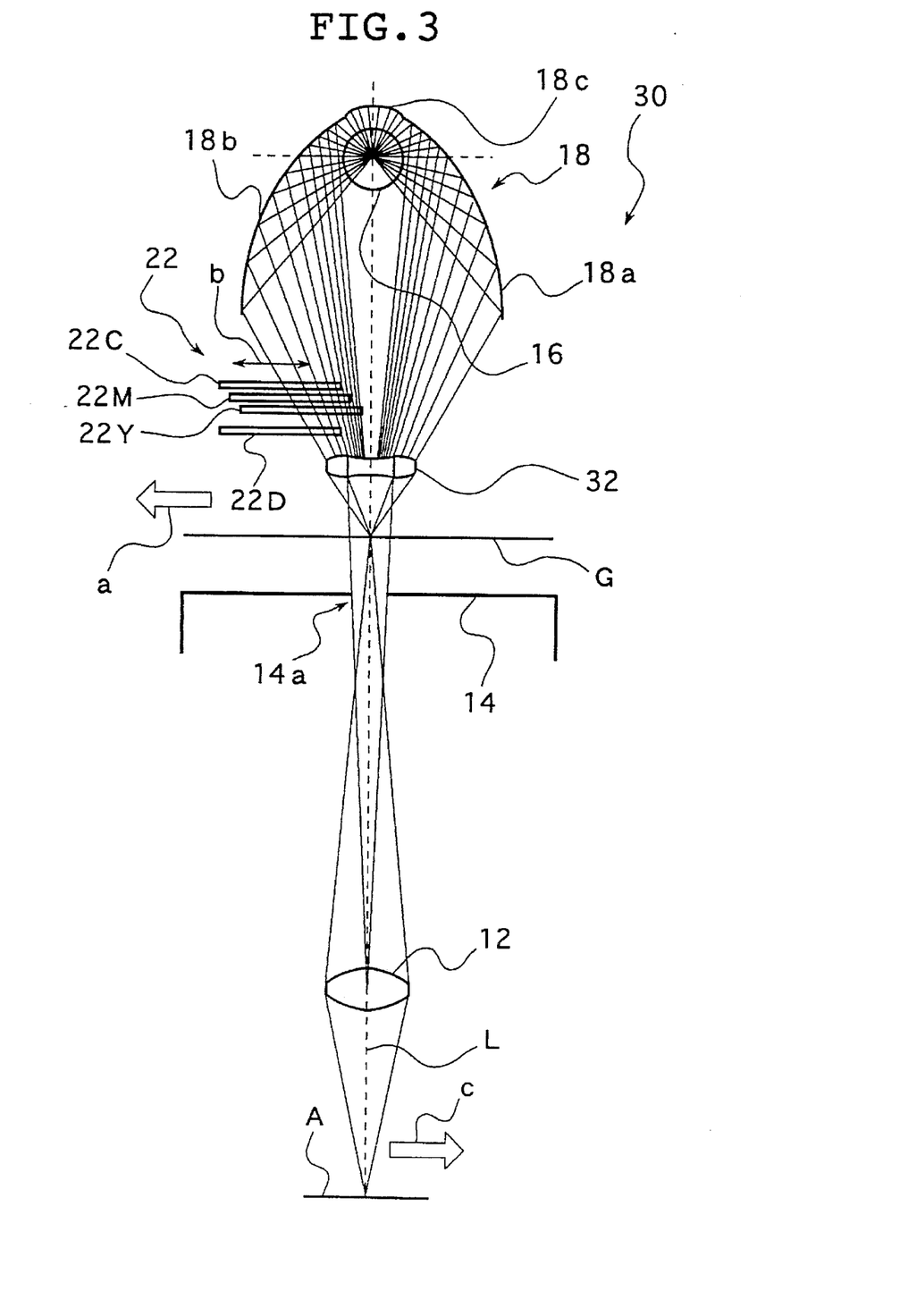
FIG. 3 is a diagram showing conceptually another embodiment of the image recording apparatus of the invention.

FIG. 3 shows conceptually another embodiment of the image recording apparatus of the invention, in which the multifocal lens is provided upstream of the focal point of the elliptical mirrors 18a and 18b.

The apparatus generally indicated by 30 in FIG. 3, as well as the other examples to be discussed below are similar to the already described apparatus 10 in many points of such aspects as component and composition and, hence, the same components are identified by like numerals and symbols and the following description will center on the differing parts.

Figure 4:
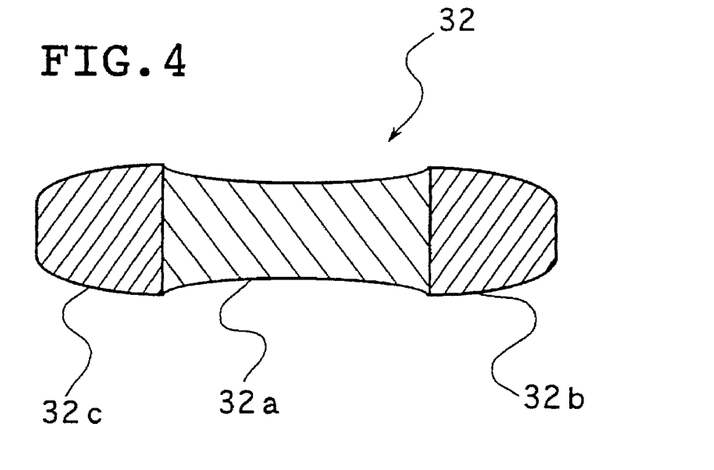
FIG. 4 is a section showing diagrammatically the multifocal lens used in the apparatus shown in FIG. 3.

As shown in FIG. 3, the image recording apparatus 30 has a multifocal lens 32 positioned upstream of the focus Lx of the elliptical mirrors 18a and 18b (see FIG. 1). In the case of the apparatus 10 shown in FIG. 1, the multifocal lens 20 is convex in each of the central part 20a and the peripheral parts 20b and 20c. In contrast, as shown enlarged in FIG. 4, the multifocal lens 32 in the apparatus 30 is convex in both peripheral parts 32b and 32c with foci lying on the original G but concave in the central part 32a. Thus, in the image recording apparatus 30 which has the multifocal lens 32 provided upstream of the focus of the elliptical mirrors 18a and 18b, the point of focusing of light by the elliptical mirrors 18a and 18b is extended by the central part 32a of the multifocal lens 32 so that the transmitted light is converged at the pupil of the imaging lens 12, thereby creating light that will contribute to the exposure of the light-sensitive material A.

Compared to the aforementioned model 10, the apparatus 30 having the arrangement just described above allows for reduction in the curvature (refractive power) of the central part 32a of the multifocal lens 32, thereby increasing the degree of freedom in the design of this lens. Additionally, the overall optical path-length of the apparatus is sufficiently reduced to facilitate the efforts to downsize the overall equipment.

Figure 5:
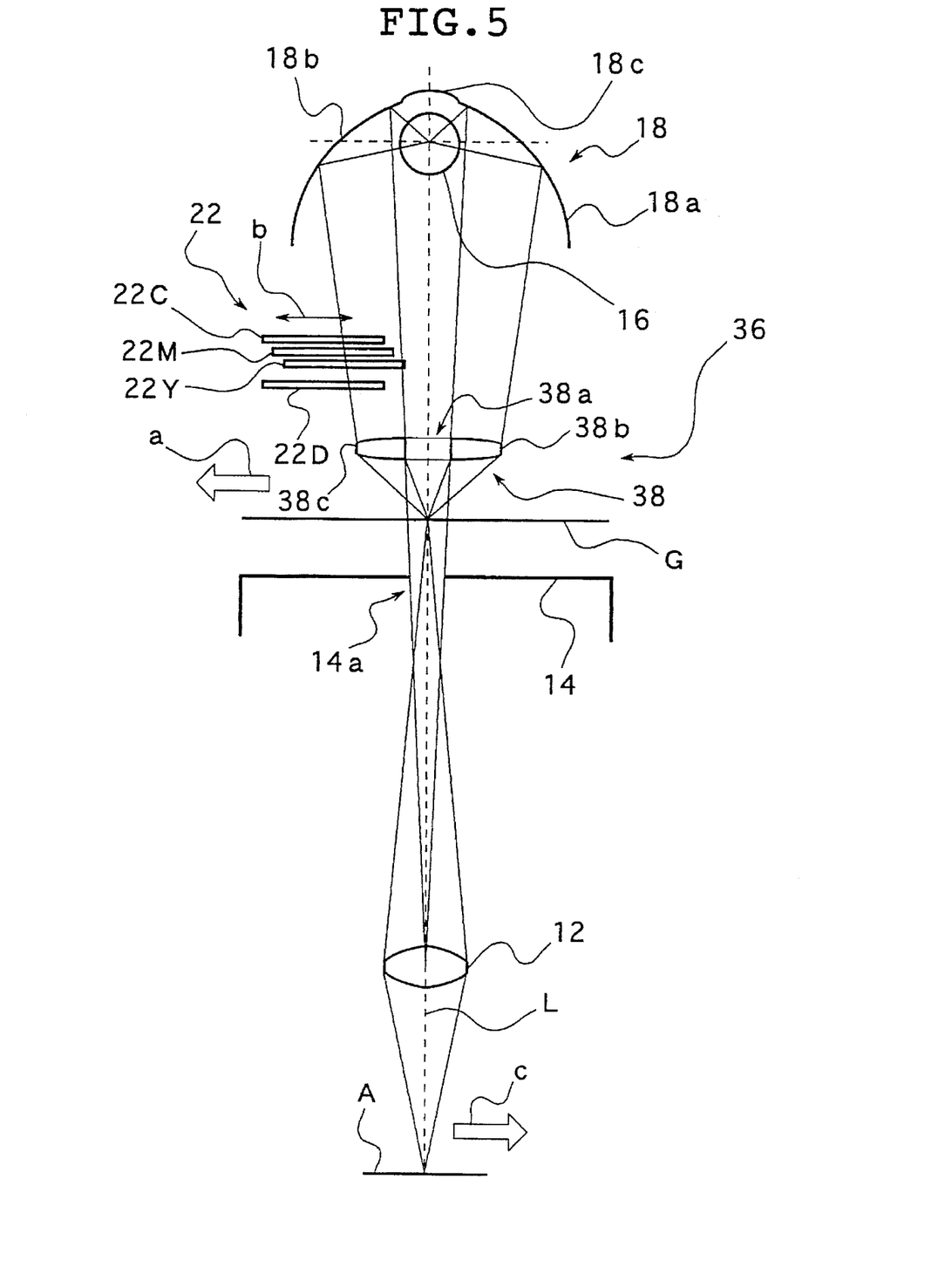
FIG. 5 is a diagram showing conceptually yet another embodiment of the image recording apparatus of the invention.

FIG. 5 shows conceptually still another embodiment of the image recording apparatus of the invention.

In the image recording apparatus 10 (and 30) already discussed above, the elliptical mirrors 18a and 18b in the reflector 18 have a focus in the optical path between the reflector 18 and the imaging lens 20 (or 32). The image recording apparatus 36 shown in FIG. 5 differs in that the elliptical mirrors 18a and 18b have a focus at the pupil of the imaging lens 12 and, in addition, that it uses a multifocal lens 38 that consists of the central part 38a having an infinite focal length and two peripheral parts 38b and 38c having foci on the original G.

Thus, those components of the light reflected from the elliptical mirrors 18a and 18b in the reflector 18 which are incident on the peripheral parts 38b and 38c of the multifocal lens 38 will converge on the original G as in the case of the aforementioned apparatus 10 and 30.

On the other hand, that part of the light which is incident on the central part 38a of the multifocal lens 38 which has an infinite focal length will simply pass through the multifocal lens 38 to converge at the pupil of the imaging lens which coincides with the focus of the elliptical mirrors 18a and 18b.

The image recording apparatus 36 having the arrangement described above is advantageous in that the multifocal lens 38 can be constructed with an inexpensive and simple design; however, there are several minor disadvantages in such aspects as the width (which increases) of the slit 14a in the aperture 14 and the quantity (which decreases) of the transmitted light entering the pupil of the imaging lens 12.

To solve this problem, a condenser lens may optionally be provided between the multifocal lens 38 and the aperture 14.

The three models of image recording apparatus that have been described on the foregoing pages share the common feature of using elliptical mirrors 18a and 18b in the reflector 18 for converging the light from the light source but this is not the sole case of the invention and the reflector may be formed of a parabolic reflector plate.

Figure 6:
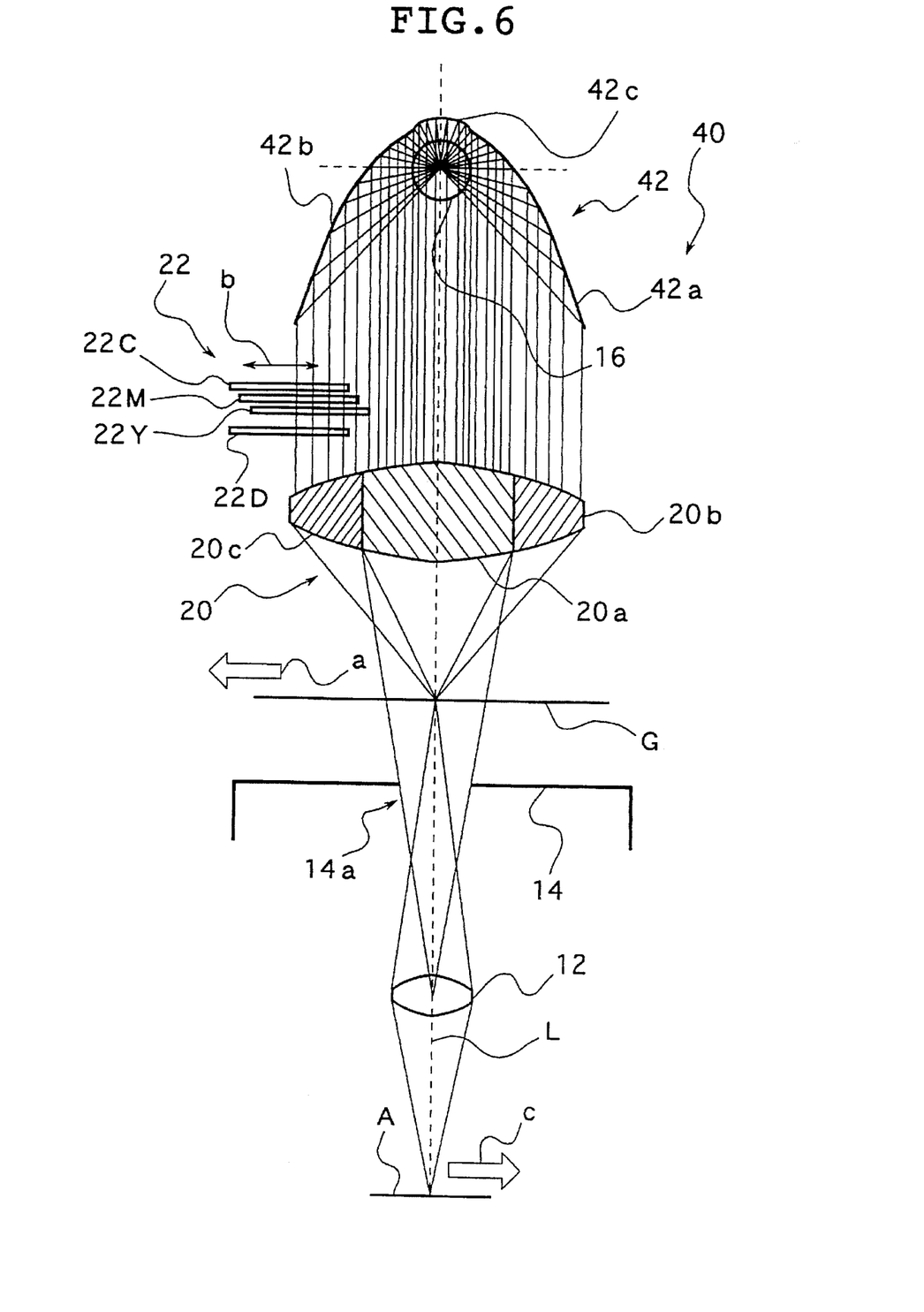
FIG. 6 is a diagram showing conceptually still another embodiment of the image recording apparatus of the invention.

FIG. 6 shows conceptually still another embodiment of the image recording apparatus of the invention, in which a parabolic reflector plate is used as the reflector. The image recording apparatus generally indicated by 40 in FIG. 6 uses a reflector 42 that comprises two parabolic mirrors 42a and 42b, and one circular mirror 42c. The two parabolic mirrors 42a and 42b are disposed on opposite sides of the light source 16 and which extend longitudinally parallel to it. The circular mirror 42c is positioned above the light source 16 and also extends longitudinally parallel to it.

As shown in FIG. 6, the parabolic mirrors 42a and 42b in the image recording apparatus 40 will receive light issuing from the light source 16 and reflect it toward the original G as light that is parallel to the optical axis L. The reflected light is then launched into the multifocal lens 20. Since the multifocal lens 20 has the same design (except in size) as the multifocal lens 20 shown in FIG. 1, the light incident on the central part 20a will pass through the original G to yield transmitted light carrying the image of the original G, which then passes through the aperture 14 to converge at the pupil of the imaging lens 12, thus contributing to the exposure of the light-sensitive material A. On the other hand, the rays of light that are incident on the peripheral parts 20b and 20c of the multifocal lens 20 will converge on the original G and function in the same manner as the diffused light created by the diffuser plate 106 shown in FIG. 9.

If, as shown in FIG. 6, the image forming apparatus has a light collimating portion in the optical path, the light adjusting means 22 is preferably disposed in this light collimating portion.

The arrangement shown in FIG. 6 offers the advantage that light can be launched normal to each optical component which, hence, is capable of operating satisfactorily to the intended design characteristics while exhibiting its performance in a consistent manner. This advantage is particularly great in the case where color filters and ND filters as optical members are in the form of interference filters that have an interfering filter layer evaporated on a transparent substrate such as a glass plate.

Figure 7:
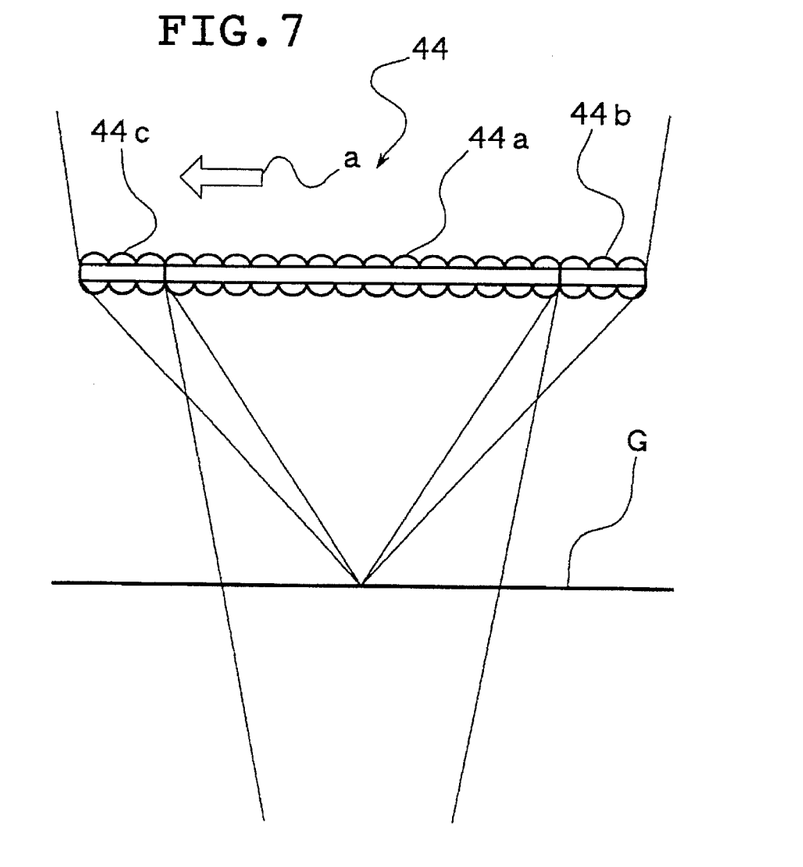
FIG. 7 is a diagram showing schematically another embodiment of the multifocal lens that can be used in the apparatus of the invention.

The image recording apparatus 40 shown in FIG. 6 which uses the parabolic mirrors 42a and 42b has a problem in that the multifocal lens 20 becomes bulky on account of its structure. To avoid this disadvantage, a Fresnel lens may be used as shown in FIG. 7 to construct a multifocal lens 44 that consists of the central part 44a having a focus at the pupil of the imaging lens 12 and two peripheral parts 44b and 44c having foci on the original G. The Fresnel lens may also be used to construct the multifocal lens in the already described models of image recording apparatus 10, 30, 36 which are shown in FIGS. 1, 3 and 6, respectively.

Figure 8:
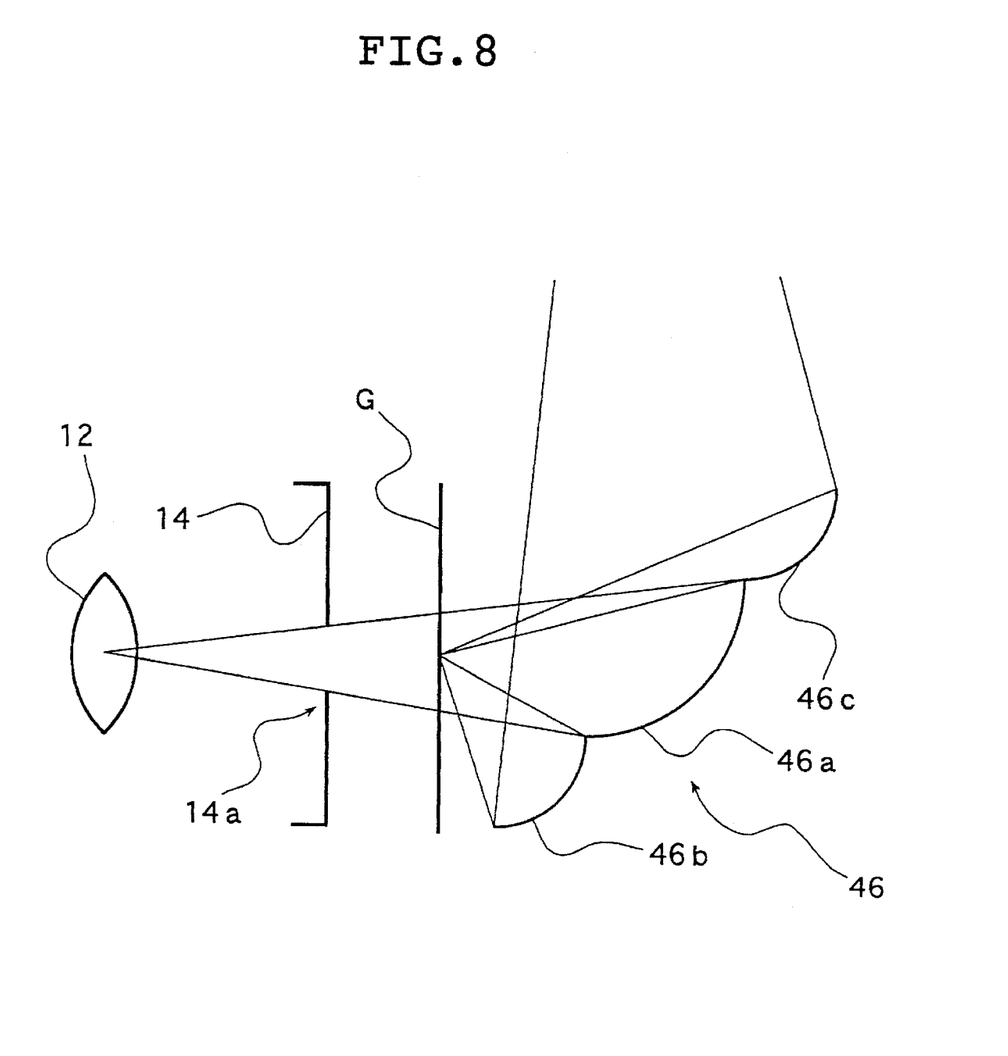
FIG. 8 is a diagram showing schematically an embodiment of the multifocal reflector plate that may be used in the apparatus of the invention.

The various models of image recording apparatus that have been described on the foregoing pages share the common feature of using a multifocal lens that has foci lying on the imaging lens and the original G; it should, however, be noted that this is not the sole case of the invention and that the multifocal lens may be replaced by a mirror having a plurality of foci as shown in FIG. 8. The multifocal mirror generally indicated by 46 consists of the central part 46a having a focus at the pupil of the imaging lens 12 and two peripheral areas 46b and 46c having foci on the original G. The peripheral area 46b is at the front end whereas the peripheral area 46c is at the rear end. The light reflected by the reflector is converged at the pupil of the imaging lens 12 by the central part 46a of the mirror and on the original G by the two peripheral parts 46b and 46c.

If necessary, an optical path changing mirror may be inserted in the optical path from the light source to the light-sensitive material so that the optical path (or the optical axis L of the imaging lens 12) is bent to reduce the overall size of the apparatus. This downsizing effect is particularly great if the optical axis of light incident on said optical changing mirror forms an angle of less than 90 degrees with the optical axis of light exiting from said mirror (i.e., the optical axis bending angle is acute).

While any known types of mirrors can be used as the optical path changing mirror, the use of a "cold mirror" which reflects visible light while transmitting infrared light is particularly preferred. The "cold mirror" is effective in preventing the light-receiving material such as a light-sensitive material from undergoing unwanted exposure to infrared radiation, whereby images of better quality can be recorded.

If the optical path changing mirror is worked to have an elliptical or parabolic surface, the efficiency of light convergence and, hence, optical efficiency can be further improved.

While the image recording apparatus of the invention has been described above in detail with reference to particular examples, it should of course be understood that the invention is by no means limited to those examples and that various changes and modifications can be made without departing from the spirit and scope of the invention. To mention just a few modifications, the mirror used to converge or collimate the light from the light source may be replaced by a mirror; or the exposure by slit scanning that is accomplished with the original being moved in the examples may be done with the light source being moved; or exposure by slit scanning that is performed to record images in the examples may be replaced by a process in which the transmitted light is processed to a rectangular or otherwise shaped beam spot which scans both the light-receiving material and the original to record an image or by a process in which the same beam spot is used to scan the image-receiving material two-dimensionally by moving the optics in the image recording apparatus two-dimensionally.

As described on the foregoing pages in detail, using the image recording apparatus of the invention, one can dispense with a diffuser plate and yet accomplishes the recording of high-quality images from transmission-type originals without causing flaws or dust, if any, to become noticeable to an undesired extent. Further, a sufficient quantity (intensity) of the transmitted light can be produced with a satisfactory optical efficiency to insure that images of satisfactory quality can be recorded even if the transmission-type original used is an overexposed negative film.

Additionally, the apparatus of the invention is simple in design and can be constructed by merely inserting a specified lens or a mirror into the optical path in conventional models and yet images can be rapidly recorded without the need to extend the time of exposure.

What is claimed is:

1. An image recording apparatus for recording an image from a transmission-type original onto a light-receiving material via an imaging lens, comprising:
   a light source which emits light to scan said transmission-type original;
   a lens that performs one of a converging operation and a collimating operation of said light from said light source onto said transmission-type original; and
   a multifocal element, having more than one focus, arranged in an optical path between said lens and said transmission-type original, one foci of said multifocal element being on said transmission-type original.

2. The image recording apparatus according to claim 1, wherein a distribution of light intensity $P(\theta)$ relative to an incident angle $\theta$ as measured at a point of said focus on said transmission-type original is generally expressed by $P(\theta) = \cos\theta$ where $\theta$ is zero degrees in a direction normal to the plane of said transmission-type original.

3. The image recording apparatus according to claim 1, wherein one foci of said multifocal element is set at infinity.

4. The image recording apparatus according to claim 1, wherein said multifocal element has different refractive powers in directions that cross each other at right angles.

5. The image recording apparatus according to claim 1, further comprising light adjusting means, provided in the optical path from said light source to said light-receiving material, said light adjusting means being one of means for adjusting the quantity of light, means for adjusting color balance and means for adjusting the balance of light quantity across the plane of said transmission-type original.

6. The image recording apparatus according to claim 5, wherein said light adjusting means is arranged in the optical path at one of a position proximate to a light converging position and at a position where the light is collimated.

7. The image recording apparatus according to claim 1, wherein an optical path bending mirror is provided in the optical path from said light source to said light-receiving material.

8. The image recording apparatus according to claim 7, wherein said optical path bending mirror is a cold mirror.

9. The image recording apparatus according to claim 7, wherein the optical path of light incident on said optical path bending mirror forms an angle of less than 90 degrees with the optical axis of light exiting said optical path bending mirror.

10. The image recording apparatus according to claim 7, wherein said optical path bending mirror has one of a parabolic surface and an elliptical surface.

11. The image recording apparatus according to claim 1, wherein said light-receiving material is one of a light-sensitive material, a screen and a photosensor.

12. The image recording apparatus according to claim 1, wherein said multifocal element is a multifocal lens.

13. The image recording apparatus according to claim 1, wherein said multifocal element is a mirror.

14. An image recording apparatus for recording an image from a transmission-type original onto a light-receiving material via an imaging lens, comprising:

a light source which emits light to scan said transmission-type original;

a mirror that performs one of a converging operation and a collimating operation of said light from said light source; and a multifocal element, having more than one focus, arranged in an optical path between said collimating means and said transmission-type original, one foci of said multifocal element being on said transmission-type original.

15. The image recording apparatus according to claim 14, wherein a distribution of light intensity P(θ) relative to an incident angle θ as measured at a point of said focus on said transmission-type original is generally expressed by P(θ)= cosθ where θ is zero degrees in a direction normal to the plane of said transmission-type original.

16. The image recording apparatus according to claim 14, wherein one foci of said multifocal element is set at infinity.

17. The image recording apparatus according to claim 14, wherein said multifocal element has different refractive powers in directions that cross each other at right angles.

18. The image recording apparatus according to claim 14, further comprising light adjusting means, provided in the optical path from said light source to said light-receiving material, said light adjusting means being one of means for adjusting the quantity of light, means for adjusting color balance and means for adjusting the balance of light quantity across the plane of said transmission-type original.

19. The image recording apparatus according to claim 18, wherein said light adjusting means is arranged in the optical path proximate to a light converging position and at a position where the light is collimated.

20. The image recording apparatus according to claim 14, wherein an optical path bending mirror is provided in the optical path from said light source to said light-receiving material.

21. The image recording apparatus according to claim 20, wherein said optical path bending mirror is a cold mirror.

22. The image recording apparatus according to claim 20, wherein the optical path of light incident on said optical path bending mirror forms an angle of less than 90 degrees with the optical axis of light exiting said optical path bending mirror.

23. The image recording apparatus according to claim 20, wherein said optical path bending mirror has one of a parabolic surface and an elliptical surface.

24. The image recording apparatus according to claim 14, wherein said light-receiving material is one of a light-sensitive material, a screen and a photosensor.

25. The image recording apparatus according to claim 14, wherein said multifocal element is a multifocal lens.

26. The image recording apparatus according to claim 14, wherein said multifocal element is a mirror.

27. An image recording apparatus for recording an image from a transmission-type original onto a light-receiving material via an imaging lens, comprising:

a rod-like light source which emits light to scan said transmission-type original;

a lens that performs one of converging and collimating of said light from said rod-like light source onto said transmission-type original; and a multifocal element, having more than one focus, arranged in an optical path between said lens and said transmission-type original, said multifocal element having a power in a lateral direction perpendicular to a longitudinal direction along said rod-like light source.

28. The image recording apparatus according to claim 27, wherein one foci of said multifocal element is on said transmission-type original.

29. An image recording apparatus for recording an image from a transmission-type original onto a light-receiving material via an imaging lens, comprising:

a rod-like light source which emits light to scan said transmission-type original;

a mirror that performs one of converging and collimating of said light from said rod-like light source onto said transmission-type original; and a multifocal element, having more than one focus, arranged in an optical path between said mirror and said transmission-type original, said multifocal element having a power in a lateral direction perpendicular to a longitudinal direction along said rod-like light source.

30. The image recording apparatus according to claim 29, wherein one foci of said multifocal element is on said transmission-type original.

* * * * *